March 10, 1964
S. E. MILLER
3,124,648
PULSE TRANSMISSION SYSTEMS EMPLOYING
NEGATIVE RESISTANCE ELEMENTS
Filed Dec. 29, 1960
2 Sheets-Sheet 1

INVENTOR
S. E. MILLER
BY Harry C. Hart
ATTORNEY

INVENTOR
S. E. MILLER
BY Harry C. Hart
ATTORNEY

United States Patent Office 3,124,648

Patented Mar. 10, 1964

3,124,648

PULSE TRANSMISSION SYSTEMS EMPLOYING NEGATIVE RESISTANCE ELEMENTS

Stewart E. Miller, Middletown, N.J., assignor to Bell Telephone Laboratories, Incorporated, New York, N.Y., a corporation of New York Filed Dec. 29, 1960, Ser. No. 79,428

10 Claims. (Cl. 178—70)

This invention relates to pulse transmission systems and more particularly to pulse regeneration in such systems by the use of negative resistance diodes.

Pulse transmission entails the long range propagation of pulse signals along a transmission path. Since the propagated signals become attenuated during their traversals of the path, it is necessary to recurrently restore their amplitudes. This is done through the incorporation into the path of successive pulse repeaters.

Each repeater is positioned at the end of a prescribed attenuation interval. Usually the repeater is of the regenerative variety for which an incoming pulse signal, exceeding a threshold level, initiates the generation of an outgoing or regenerated pulse signal. With a regenerative repeater the outgoing signal is substantially unaffected by distortion of the incoming signal and the spontaneous disturbances added to it by the transmission path.

In effect, pulse signals that are regenerated and propagated may be likened to the members of a relay team stationed at intervals along a length of track. Each runner traverses a relay interval and initiates the start of a successor, thus establishing a sequence of operations that continues until all intervals have been traversed.

A regenerative repeater desirably possesses a multistate capability. Typically, the repeater is bistate and, as such, is capable of adopting either of two signal states. Initially the repeater is set in an equilibrium signal state by energizing signals and, after being activated by an incoming or regenerating signal, it adopts an alternative signal state for a controlled time duration. It is apparent that a change from one signal state to another should occur rapidly if there is to be minimal disturbance with the information content of the signals being regenerated and if the transmission system is to accommodate high pulse rates.

With conventional circuit elements, rapid signal regeneration has been attained through the use of auxiliary feedback paths. However, negative resistance devices inherently possess a multistate capability that renders such paths unnecessary. Accordingly, it is an object of the invention to adapt negative resistance devices in general, and bistate negative-resistance diodes in particular, for employment in regenerative repeaters.

This adaptation must be made with a view to enabling each change in signal state of a negative resistance device incorporated into a transmission path to be propagated along the path in a forward direction. Additionally, the forwardly propagated signals must be of the proper polarity to act as regenerating signals at succeeding repeaters. Consequently, it is a further object of the invention to assure forward propagation of regenerated pulse signals along a transmission path and to assure continuity of that propagation throughout the entire length of the path. When the negative resistance devices are bilateral, as are negative resistance diodes, changes in signal state produce a reverse propagation as well. If there is to be no interference with oncoming pulse signals, this reverse propagation must be prevented, and it is a concurrent object of the invention to do so without interfering with the desired forward propagation.

As incorporated into a transmission path the various negative resistance devices constitute repeaters which are set in their equilibrium signal states by energizing signals. Often extended portions of the transmission path are inaccessible and it is advantageous to energize the system only at its extremities. In that event, with bistate repeaters, for example, there is an uncertainty as to which of the two signal states will be adopted by successive repeaters. Furthermore, because of the multistate capability, there is the possibility that a repeater which adopts an alternative signal state in response to a regenerating signal may be unable to revert to its original equilibrium signal state. Consequently, it is a still further object of the invention to stabilize the repeaters by constraining them to the adoption of prescribed equilibrium signal states to which they return following temporary transitions to alternative states. A related object is to stabilize the repeaters while preserving their regenerative capabilities.

This invention is characterized by the incorporation, into a transmission path, of tandem-connected negative resistance devices that are energized at the extremities of the path and constitute the regenerative components of successive repeaters in a pulse transmission system. Each negative resistance device displays a current-voltage characteristic with at least one threshold-terminated region of negative resistance.

In order to circumvent the uncertainty in the adoption of equilibrium signal states that could arise because of the tandem connection of the negative resistance devices and the way in which they are energized, the invention prescribes that each device be shunt-stabilized by a frequency-sensitive circuit. This results in negative resistance masking by which the repeaters present a positive resistance to their energizing signals and are thus constrained to the adoption of prescribed equilibrium signal states, despite their multistate capabilities. At the same time the stabilizing circuits preserve the negative resistance behavior of their repeaters with respect to regenerating signals by confining those signals to passage through respective negative resistance devices. Consequently, for a given repeater, a regenerating signal that causes a threshold level to be exceeded leads to a change in signal state, but in consequence of the masking, the repeater returns to its initial equilibrium signal state after a duration determined by the time constant of the stabilizing circuit and the negative resistance device. When the negative resistance device is a diode, the stabilizing circuit advantageously encompasses the series combination of a masking resistor and a stabilizing inductor.

According to the invention, back propagation is prevented and forward propagation is assured through the employment of diversely functioning coupling circuits. One of the coupling circuits permits regenerating pulse signals originating at a preceding repeater to pass unimpeded through the negative resistance device of a given repeater while inhibiting the passage of regenerated pulse signals to the preceding repeater. The other coupling circuit operates in an opposed fashion to inhibit the passage of regenerating pulse signals while facilitating the passage of regenerated pulse signals to a succeeding repeater. When the regenerative component of a repeater is a negative resistance diode, the coupling circuits advantagely form a lattice structure with the diode.

To assure continuity of propagation among the repeaters of the transmission path, the invention envisages several system arrangements. In one arrangement the negative resistance devices of successive and like-oriented repeaters are stabilized in alternate signal states; in another arrangement the devices are stabilized in like signal states, but their repeaters are alternately inverted.

That the invention accomplishes the above and related objects will be apparent after a consideration of several of its illustrative embodiments taken in conjunction with the drawings, in which.

Figure 1:
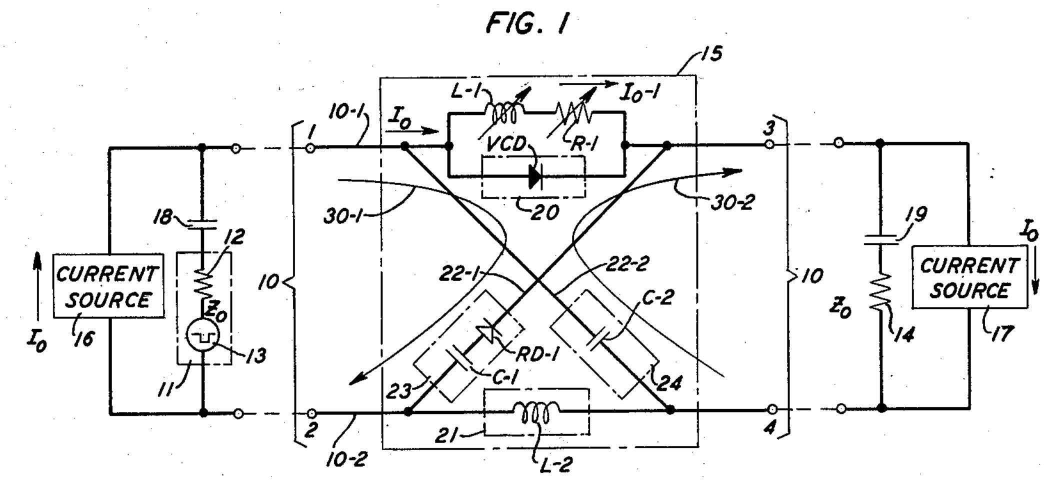
FIG. 1 is a schematic diagram of a pulse transmission system with a single repeater employing a stabilized voltage-controlled diode as its regenerative component.

Turn now to the pulse transmission system of FIG. 1 showing a dual conductor transmission path 10 that extends between a source 11 of pulse signals, represented by the series combination of a resistor 12 and a voltage source 13, and a load 14. To insure maximum transfer of pulse signal energy, the impedance of the load 14 and that associated with the source 11 are matched to the characteristic impedance $Z_0$ of the path 10.

For convenience, FIG. 1 shows but a single four-terminal repeater 15 incorporated into the transmission path 10, but it is to be understood that there is a similar repeater at each position marking the termination of an attenuation interval along the path 10. The repeaters are provided with power supply or energizing signals from the extremities of the path 10 by, for example, constant current sources 16 and 17, which are isolated from the pulse source 11 and the load 14 by respective blocking capacitors 18 and 19.

For the repeater 15 depicted in FIG. 1 two of its paths 10—1 and 10—2 encompass the conductors of the transmission system. The first of these is a conduction path that extends between the first and the third terminals 1 and 3 of the repeater 15 and includes a negative resistance regenerative component 20, such as a voltage-controlled diode VCD, which is shunt-stabilized by the series combination of an adjustable inductor L–1 and an adjustable stabilizing resistor R–1. A second conduction path 10—2 extends between the second and the fourth terminals 2 and 4 of the repeater 15 and includes a component 21, typically an inductor L–2, for substantially impeding the propagation of transient pulse signals without hindering the flow of the power supply energy.

Interconnecting the second terminal 2 with the third terminal 3 is a first diagonal cross-coupling path 22—1 that includes a component 23 for blocking both the passage of power supply energy and of regenerated signals. The constituents of the blocking component 23 are conveniently a capacitor C–1 and a rectifying diode RD–1, which is poled to facilitate passage of the regenerating signals. A second diagonal cross-coupling path 22—2 interconnects the first terminal 1 with the fourth terminal 4 and includes a component 24, typically a capacitor C–2, for allowing diode regenerated signals to bypass the pulse source 11 while blocking the flow of power supply energy.

Figure 2:
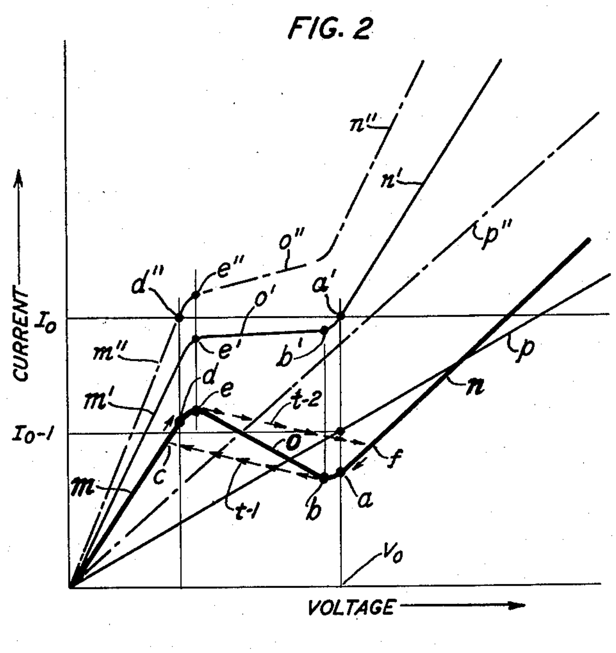
FIG. 2 is a set of characteristic curves explanatory of the operation of the repeater depicted in FIG. 1 and of the alternate stabilization technique taught by the invention.

To understand the regenerative action of the repeater 15 in FIG. 1, consider the characteristic curves of FIG. 2. The curve attributable to the controlled diode VCD alone displays a first region *m* of positive resistance terminated in a peak threshold *e*, a second region *n* of positive resistance commencing with a valley threshold *b* and an intervening region *o* of negative resistance between the thresholds *e* and *b*. By contrast a typical characteristic curve *p* associated with the stabilizing resistor R–1 exhibits a positive resistance throughout. For convenience it is indicated as being entirely linear.

Since the stabilizing resistor R–1 and the regenerative diode VCD are connected in shunt, a composite characteristic *m′, o′, n′*, applicable to the first conduction path 10—1 of the repeater 15 in FIG. 1, is obtained by summing the current ordinates of both the resistor and the diode characteristics *p* and *m, o, n* for each voltage along the axis of abscissas in FIG. 2. To achieve masking with respect to the power supply or energizing signals, the stabilizing resistor R–1 is proportioned to assure that the composite characteristic *m′, o′, n′* has a positive slope over its entire range. This condition is satisfied, when the slope of the stabilizing resistor characteristic *p*, for a linear resistance, is equal to or greater than the minimum slope of the diode characteristic *m, o, n* in its negative resistance region *o*.

In establishing the equilibrium operating point of the composite characteristic *m′, o′, n′* required for regenerative action, the constant current sources 16 and 17 of FIG. 1 are adjusted to supply the first conduction path 10—1 with a steady current $I_0$ that sets the equilibrium operating point either (1) just below the knee *e′*, or (2) just above the upper knee *b′* of the composite characteristic *m′, o′, n′*. Assume that the source 11 of FIG. 1 provides negative-going pulse signals; then the second equilibrium condition is required. Under that circumstance, the diode VCD operates at a point *a* on its characteristic curve *m, o, n* in the second positive resistance region *n* just above its valley threshold *b* as can be determined from the abscissa of the equilibrium voltage $V_0$ corresponding to the ordinate at point *a′* of the composite characteristic *m′, o′, n′* for the steady current $I_0$.

From the standpoint of the regenerative transient effect initiated by pulse signals emanating from the source 11, the diode equilibrium point *a* may be taken as the origin of the current-voltage coordinates. When a negative-going pulse signal arrives at the repeater 15, the inertial effect of the series inductor L–1 prevents the presence of the pulse from initially altering the steady current $I_0$–1 flow through the stabilizing resistor R–1. The magnitude of that current $I_0$–1 is given by the ordinate of the resistor characteristic *p* corresponding to the equilibrium voltage $V_0$. As a consequence, the pulse signal produces a circulating incremental current that flows in the loop 30—1 encompassing the diode VCD, the first cross-coupling path 22—1 and the source 11.

As far as the diode VCD is concerned, its current locus is quickly depressed below the valley threshold *b* whereupon the locus undergoes a substantially instantaneous excursion to the first region *m* of positive resistance along a transient load line *t*–1 corresponding to the reciprocal magnitude of the transient impedance governing rapid signal changes at the diode VCD. Because of the concerted effects of the cross-coupling paths 22—1 and 22—2 and the second conduction path 10—2 of the repeater 15, the transient effects operate in the loop 30—2 encompassing the second cross-coupling path 22—2, the controlled diode VCD, and the load 14 so that the transient impedance is given by the characteristic impedance $Z_0$ of the path as seen in the forward direction of propagation, and is unaffected by the characteristic impedance $Z_0$ seen in the reverse direction of propagation. Once the locus reaches the first region *m* of a positive resistance the rate of the diode current transition is decelerated. This occurs because of the current changes that begin to take place in the shunting inductor L–1. As a result of the decay in the inductor current an increasing voltage is developed that forces the operating locus of the controlled diode VCD beyond the peak threshold *e* of its first region *m* of positive resistance. Thereupon, the locus once again traverses a transient load line *t*–2 to the second region *n* of positive resistance and ultimately assumes the initial equilibrium position *a* from which generation of the outgoing transient signal indicated in FIG. 1 commenced.

Thus, the stabilizing resistor R–1 has the effect of masking the negative resistance region *o* of the diode VCD for steady signals in order to prevent an indeterminacy in the equilibrium voltage condition; that is to say, the diode equilibrium condition which, in the absence of stabilization, is capable of existing either in the first region $m$ of positive resistance or in the second region $n$ of positive resistance for a prescribed energizing current $I_0$ is constrained to that region associated with the abscissal voltage $V_0$ corresponding to the ordinate of the composite characteristic $m'$, $o'$, $n'$ for the prescribed current $I_0$. The inductor L–1, on the other hand, preserves the negative resistance character of the regenerative diode VCD and enables that diode VCD to rapidly regenerate incoming pulse signals.

Figure 3:
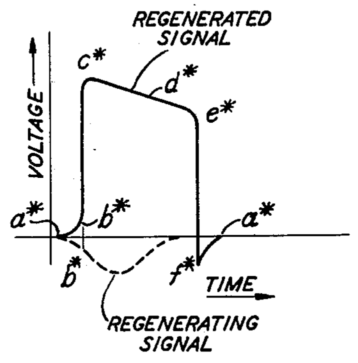
FIG. 3 is a diagram showing typical waveforms for regenerating and regenerated pulse signals associated with the repeater of FIG. 1.

The time-scale relationship between the regenerating pulse signal emanating from the pulse source 11 and the corresponding regenerated pulse signal developed at the diode VCD is indicated in FIG. 3 by respective dashed-line and solid-line waveforms whose asterisked markers are associated with similar unasterisked markers in the closed-loop locus of FIG. 2. Passage of the regenerating pulse signal through the diode VCD by way of the first cross-coupling path 22—1 of FIG. 1 initiates signal change at the diode VCD which results in the launching, along the outgoing portion of the transmission path 10, of a transient voltage wave, indicated by the solid-line waveform in FIG. 3, whose initial portion is a positive-going counterpart of the dashed-line and negative-going regenerating signal. On attainment by the regenerating signal of the valley threshold $b$ in FIG. 2, the diode current changes rapidly and causes an abrupt change in regenerated voltage seen in the waveform of the regenerated voltage in FIG. 3. The subsequent increase in diode current, until the peak threshold $e$ of FIG. 2 is attained, is manifested in a gradual decrease in the regenerated voltage whose duration is controlled by the time constant of the controlled diode VCD, as stabilized, with the consequence that the durations of the regenerated and regenerating pulse signals are independent of each other.

Because of its bilateral nature, the diode VCD of FIG. 1 would attempt to propagate the regenerated pulse signals backward toward the source 11 were it not for the blocking component 23 provided in the first cross-coupling path 22—1. In that path 22—1 the rectifying diode RD–1 is so poled that it presents a substantially infinite impedance to regenerated signals.

In contrast, the forward propagation of the regenerated pulse signals is assured by the presentation of a negligible impedance to such signals through the introduction of a bypass component 24, typically a capacitor C–2 in the second coupling path 22—2. At the same time the second path 22—2 is prevented from conducting regenerating pulse signals by the impeding action of a component 21, typically an inductor L–2, that extends between the second and fourth terminals 2 and 4 of the repeater 15.

Figure 4A:
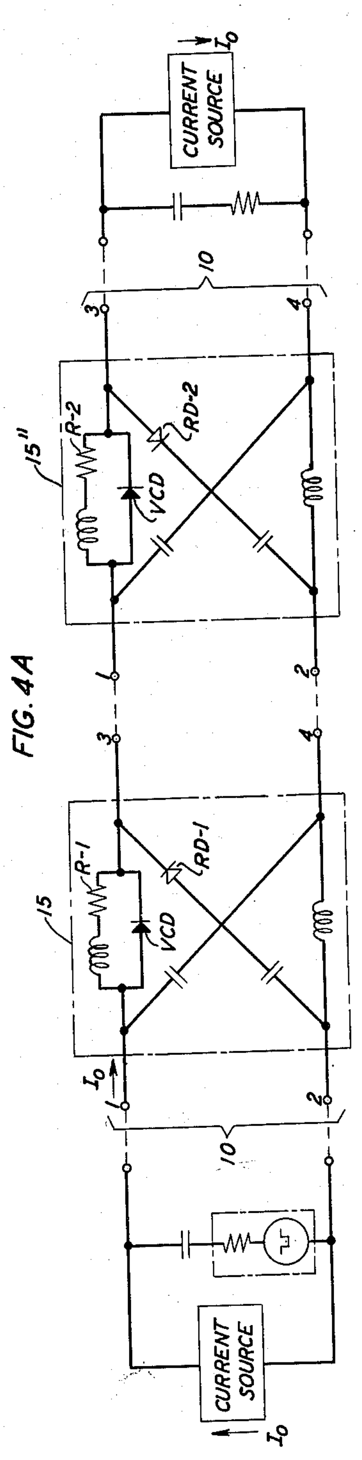
FIG. 4A is a block and wiring diagram of a multirepeater pulse transmission system for which the constituent repeaters are stabilized in alternate signal states.

While the arrangement of FIG. 1 prevents the reverse propagation of regenerated pulse signals and assures their forward propagation, it is to be noted that the forwardly propagated signals are of opposite polarity from the regenerating signals which produce them. Consequently, if a succeeding repeater is to be activated, it must be more than a mere duplication of its predecessor. A multi-repeater arrangement that accommodates successive regenerating signals of opposite polarity is shown in FIG. 4A. The repeaters 15 and 15'', which are illustratively included in the kind of transmission path 10 depicted in FIG. 1, are alike except for the alternate polings of their rectifying diodes RD–1 and RD–2 and the alternate adjustments of their stabilizing resistors R–1 and R–2. Regarding the stabilizations, if the first repeater 15 and alternate ones (not shown) are set in a stable equilibrium signal state $a'$ just above the upper knee $b'$ of the composite characteristic $m'$, $o'$, $n'$. shown in FIG. 2, the second repeater 15'', and its alternates must be set in an equilibrium signal state $d''$ just below the lower knee $e''$ of a similar composite characteristic $m''$, $o''$, $n''$. Such a characteristic $m''$, $o''$, $n''$ is derived by an alternate adjustment of the stabilizing resistor R–2 connected in shunt with the negative resistance diode VCD in the second repeater 15''. The alternate resistance characteristic $p''$, indicated by dashed lines in FIG. 2, is combined with the diode characteristic $m$, $o$, $n$ to yield a dashed line composite characteristic $m''$, $o''$, $n''$, whose energizing current ordinate lies below its lower knee $e''$, as required.

Consequently, a negative-going regenerated pulse signal applied at the first repeater 15 of FIG. 4A produces, in the manner previously described, a positive-going regenerated pulse. Since the second repeater 15'' of FIG. 4A is stabilized below the lower knee $e''$ of its composite characteristic $m''$, $o''$, $n''$, as shown in FIG. 2, the positive-going regenerated pulse of the first repeater 15 is of the proper polarity to serve as a regenerating signal at the second repeater 15'' and cause the peak threshold $d$ of its controlled diode VCD to be exceeded. This initiates a regenerative action following the same loci of FIG. 2 that applied to the first repeater 15, except for having its point of origin $d$ in the first region $m$ of positive resistance, rather than in the second region $n$ of positive resistance. Because the outgoing pulse signal produced by the second repeater 15'' is of a negative polarity, it is capable of initiating a regenerative action at a third repeater (not shown), which has been stabilized in the same fashion as the first. In this way an input pulse signal applied at one extremity of the transmission path 10, incorporating tandem-connected paired units of the kind shown in FIG. 4A, is rapidly regenerated and propagated throughout the entire length of the path 10 until a regenerated pulse signal ultimately arrives at a terminal load.

Figure 4B:
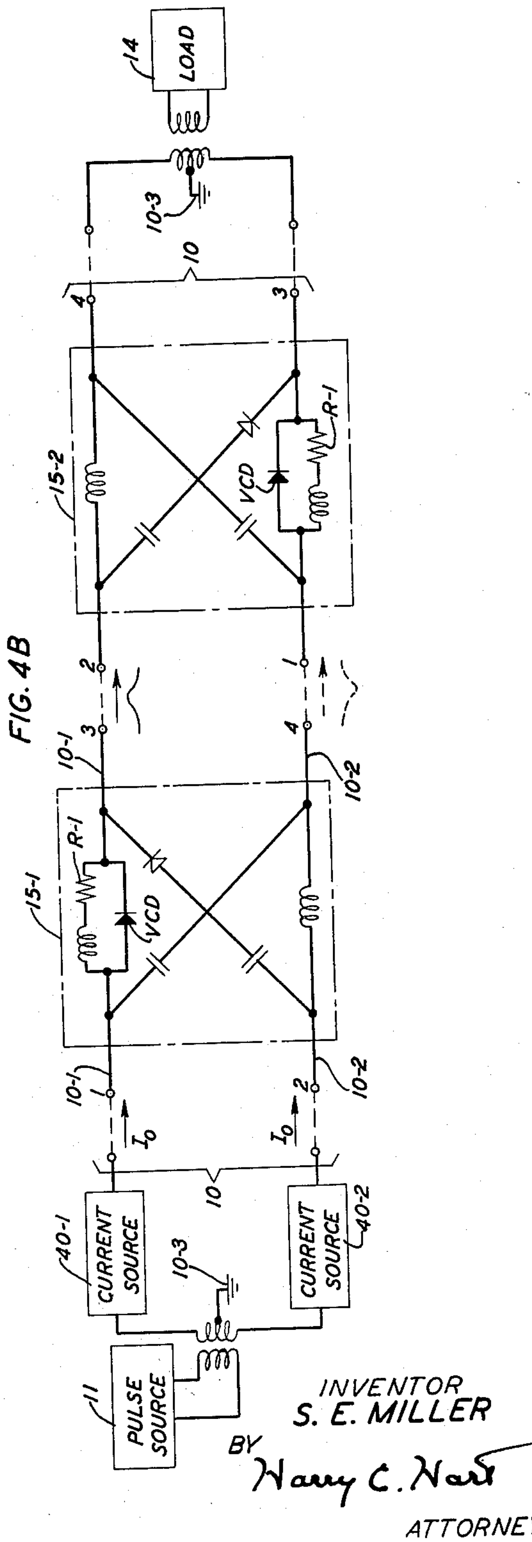
FIG. 4B is a block and wiring diagram of a multirepeater pulse transmission system for which the constituent repeaters are stabilized in like signal states and alternately inverted.

However, when the transmission system admits of a third conduction path, such as the ground return 10—3 identified in FIG. 4B at the position of the pulse source 11 and at the position of the load 14, the repeaters, of which but two are shown, may be identical and it is only necessary that alternate ones be inverted so that the third and fourth terminals 3 and 4 of each preceding repeater 15—1 are respectively connected to the second and first terminals 2 and 1 of each succeeding repeater 15—2. With this arrangement the equilibrium biasing currents that are supplied, for example, by respective constant current sources 40—1 and 40—2 traverse the ungrounded transmission path conductors 10—1 and 10—2 in the same direction.

Consequently, if each repeater 15 of FIG. 4B is stabilized above the knee $b$ of its composite characteristic $m'$, $n'$, $o'$ (see FIG. 2), a negative-going regenerating pulse signal arriving at the first repeater 15—1 produces, in the manner previously described, an outgoing pulse signal which has a positive polarity as measured on the first conductor 10—1 and indicated by the solid-line waveform and which has a negative polarity as measured on the second conductor 10—2 and indicated by the dashed-line waveform.

Because the second repeater 15—2 is inverted, its controlled diode VCD is in the second conductor 10—2 where it is energized by the second current source 40—2. Hence, the negative-going pulse signal arriving at the first terminal 1 of the second repeater 15—2 initiates the kind of regenerative action described previously.

As for the outgoing signal of the second repeater 15—2, it is capable of initiating the regenerative action of a succeeding repeater (not shown) whose orientation is like that of the first repeater 15—1. Therefore, an input pulse signal applied at one extremity of the transmission path 10 in FIG. 4B is rapidly regenerated and propagated throughout the entire length of the path 10 until a regenerated pulse signal ultimately arrives at a terminal load.

Related adaptations of negative resistance devices for incorporation into a transmission path, as well as ways for stabilizing the devices and coupling them to assure forward propagation and prevent reverse propagation, along with ways of providing the devices with energizing signals at the extremities of the transmission path, will occur to those skilled in the art.

What is claimed is:

1. A pulse repeater in a transmission path interconnecting a source of signals and a load, which repeater comprises means having a current-voltage characteristic with a threshold-terminated region of negative resistance, means for masking the negative resistance region of said characteristic for a steady bias signal supplied by the source, means for maintaining said negative resistance region unmasked for pulse signals propogated along the transmission path from said source, and means for confining the forward propagation of said pulse signals to said negative resistance means, whereby attenuated pulse signals passing through said negative resistance means and exceeding said threshold level are regenerated with enhanced energy supplied by said steady bias signal.

2. Apparatus as dfined in claim 1, wherein said confining means comprises rectifying means for inhibiting the reverse propagation of the regenerated pulse signals.

3. Apparatus as defined in claim 1 further including reactive means for facilitating the forward propagation of the regenerated pulse signals to the load.

4. Apparatus as defined in claim 3 further including means for isolating said confining means from said facilitating means whereby said facilitating means is prevented from diverting said attenuated pulse signals from said confining means.

5. Apparatus as defined in claim 1, wherein said masking means is a resistor whose resistive magnitude is proportioned to be less than or equal to the minimum resistive magnitude of said negative resistance means.

6. A four-terminal network for regenerating pulse signals which comprises a stabilized voltage-controlled diode interconnecting the first terminal with the third, first means affording a negligible impedance to pulse signals interconnecting the second terminal with the third, said first means including rectifying means, second means affording a negligible impedance to said pulse signals interconnecting the first terminal with the fourth, and means affording a substantial impedance to said pulse signals interconnecting a substantial impedance to said pulse signals interconnecting the second terminal with the fourth.

7. A pulse transmission system which comprises a plurality of like-stabilized four-terminal networks, each as defined in claim 6, connected in tandem, the third and fourth terminals of each preceding network being respectively connected to the second and first terminals of each succeeding network.

8. A pulse transmission system which comprises a plurality of alternately stabilized four-terminal networks, each as defined in claim 6, said networks being tandem-connected in pairs for which the third and fourth terminals of the first member of each pair are respectively connected to the first and second terminals of the second member of said pair.

9. Apparatus for regenerating, at selected positions along paired and biased conduction paths, propagated pulse signals that may have become attenuated while traversing the paths in a forward direction and for preventing propagation of the regenerated pulse signals in a backward direction, which apparatus comprises, at each selected position, a voltage-controlled negative resistance diode connected in shunt with the series combination of a resistor and an inductor, said diode being included in one of the conduction paths and poled in the forward propagation direction of the propagated pulse signals, means included in the other of said conduction paths for impeding the passage of said propagated pulse signals, first means cross-coupling the cathode of said diode and said impeding means in a diagonal fashion for presenting a negligible impedance to the passage of said propagated pulse signals and for presenting a substantial impedance to the passage of regenerated pulse signals and second means cross-coupling the anode of said diode and said impeding means in a diagonal fashion for presenting a negligible impedance to the passage of said regenerated pulse signals.

10. In a pulse transmission system for restoring the amplitudes of pulse signals that become attenuated while being propagated therethrough a plurality of tandem-connected repeaters, and means for biasing said repeaters with a prescribed equilibrium signal state, each of which repeaters comprises, means having current-voltage characteristics with first and second regions of positive resistance separated by a region of negative resistance for regenerating the pulse signals, means for confining the forward propagation of said pulse signals to said regenerating means, said confining means comprising means for preventing the backward propagation of regenerated pulse signals from said regenerating means, means for permitting the forward propagation of said regenerated pulse signals from said regenerating means, and means for masking the negative resistance region of said regenerating means for said steady signal, said masking means comprising, for alternate ones of said repeaters, means for setting the regenerating means of the alternate repeaters in a condition of stable equilibrium in said first region of positive resistance and, for the remaining ones of said of said repeaters, means for setting the regenerating means of the remaining repeaters in a stable equilibrium condition in said second region of positive resistance.

References Cited in the file of this patent

UNITED STATES PATENTS

| | | |
|---|---|---|
| 2,522,395 | Ohl | Sept. 12, 1950 |
| 2,522,402 | Robertson | Sept. 12, 1950 |
| 2,585,571 | Mohr | Feb. 12, 1952 |